United States Patent
Khoshnevisan et al.

(10) Patent No.: US 11,457,462 B2
(45) Date of Patent: Sep. 27, 2022

(54) MULTI-TRANSMIT RECEIVE POINT MODE MIXING

(71) Applicant: QUALCOMM Incorporated, San Diego, CA (US)

(72) Inventors: Mostafa Khoshnevisan, San Diego, CA (US); Tao Luo, San Diego, CA (US); Xiaoxia Zhang, San Diego, CA (US); Jing Sun, San Diego, CA (US); Sungwoo Park, San Diego, CA (US); Arumugam Chendamarai Kannan, San Diego, CA (US); Makesh Pravin John Wilson, San Diego, CA (US); Vinay Chande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 16/717,076

(22) Filed: Dec. 17, 2019

(65) Prior Publication Data

US 2020/0205187 A1    Jun. 25, 2020

Related U.S. Application Data

(60) Provisional application No. 62/782,059, filed on Dec. 19, 2018.

(51) Int. Cl.
*H04W 72/12*    (2009.01)

(52) U.S. Cl.
CPC ... *H04W 72/1289* (2013.01); *H04W 72/1273* (2013.01)

(58) Field of Classification Search
CPC ............ H04W 72/1289; H04W 72/1273
See application file for complete search history.

(56) References Cited

U.S. PATENT DOCUMENTS

| | | | |
|---|---|---|---|
| 2018/0343653 A1* | 11/2018 | Guo | .......... H04W 16/28 |
| 2020/0015200 A1* | 1/2020 | Vilaipornsawai | ... H04L 25/0204 |
| 2020/0153581 A1* | 5/2020 | Tsai | .......... H04L 5/0035 |

FOREIGN PATENT DOCUMENTS

WO    2018141246 A1    8/2018

OTHER PUBLICATIONS

Apple: "Considerations on PDCCH design for NCJT", 3GPP Draft, 3GPP TSG RAN WG1 Meeting #95, R1-1812920 Considerations on PDCCH design for NCJT, 3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018 Nov. 11, 2018 (Nov. 11, 2018), XP051554884, pp. 1-7, Retrieved from the Internet URL:http://www.3gpp.org/ftp/Meetings%5F3GPP%5FSYNC/RAN1/Docs/R1%2D1812920%2Ezip [retrieved on Nov. 11, 2018] Sect. 2.

(Continued)

*Primary Examiner* — Brian P Cox
(74) *Attorney, Agent, or Firm* — Harrity & Harrity, LLP

(57) ABSTRACT

Various aspects of the present disclosure generally relate to wireless communication. In some aspects, a user equipment (UE) may receive a first downlink control information (DCI) communication for scheduling a first physical downlink shared channel (PDSCH). The first PDSCH may be associated with at least a first transmit receive point (TRP). The UE may receive a second DCI communication for scheduling a second PDSCH. The second PDSCH may be associated with a second TRP and at least one of the first TRP or a third TRP. The UE may receive downlink communications based at least in part on the first DCI communication and the second DCI communication. Numerous other aspects are provided.

30 Claims, 14 Drawing Sheets

(56) References Cited

OTHER PUBLICATIONS

CATT: "Multi-TRP/panel transmission enhancement for Rel-16", 3GPP Draft, 3GPP TSG RAN WG1 Meeting #95, R1-1812635, 3rd Generation Partnership Project (3GPP), Mobile Competence Centre, 650, Route Des Lucioles, F-06921 Sophia-Antipolis Cedex, France, vol. RAN WG1. No. Spokane, USA Nov. 12, 2018-Nov. 16, 2018 Nov. 3, 2018 (Nov. 3, 2018), XP051478876, 12 Pages, Retrieved from the Internet: URL:http://www.3gpp.org/ftp/tsg%5Fran/WG1%5FRL1/TSGR1%5F95/Docs/R1%2D1812635%2Ezip [retrieved on Nov. 13, 2018] Sect. 4.
CHTTL: "Discussion on Mult-TRP transmission", 3GPP Draft, 3GPP TSG RAN WG1 Meeting #95, R1-1813278,3rd Generation Partnership Project (3GPP), Mobile Competence Centre, 650, Route Des Lucioles, F-06921 Sophia-Antipolis Cedex, France, vol. RAN WG1. No. Spokane, USA Nov. 12, 2018-Nov. 16, 2018 Nov. 11, 2018 (Nov. 11, 2018), XP051555294, 5 Pages, Retrieved from the Internet: URL:htlp://www.3gpp.org/ftp/Meetings%5F3GPP%5FSYNC/RAN1/Docs/R1%2D1813278%2Ezip [retrieved on Nov. 11, 2018] Sect.s 2.2. 2.3.
CMCC: "Discussion on DL multi-TRP transmission", 3GPP Draft, 3GPP TSG RAN WG1 Meeting #95, R1-1812887, 3rd Generation Partnership Project (3GPP), Mobile Competence Centre, 650, Route Des Lucioles, F-06921 Sophia-Antipolis Cedex, France, vol. RAN WG1. No. Spokane, USA Nov. 12, 2018-Nov. 16, 2018 Nov. 11, 2018 (Nov. 11, 2018), XP051554849, 5 Pages, Retrieved from the Internet: URL:http://www.3gpp.org/ftp/Meetings%5F3GPP%5FSYNC/RAN1/DOCS/R1%2D1812887%2Ezip [retrieved on Nov. 11, 2018] Sect. 2.1.
Intel Corporation: "Discussion on multi-TRP/multi-panel transmission", 3GPP TSG RAN WG1 Meeting #95, R1-1812509 MultiTRP Final, 3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018 Nov. 3, 2018 (Nov. 3, 2018), XP051478738, pp. 1-13, Retrieved from the Internet: URL:http://www.3gpp.org/ftp/tsg%5Fran/WG1%5FRL1/TSGR1%5F95/Docs/R1%2D1812509%2Ezip [retrieved on Nov. 3, 2018]p. 1-p. 2 p. 6, p. 8-p. 9.
International Search Report and Written Opinion—PCT/US2019/067143—ISA/EPO—dated Apr. 22, 2020.
Nokia et al., "Enhancements on Multi-TRP/Panel Transmission", 3GPP Draft, 3GPP TSG RAN WG1 Meeting #95, R1-1813489, 3rd Generation Partnership Project (3GPP), Mobile Competence Centre, 650, Route Des Lucioles, F-06921 Sophia-Antipolis Cedex, France, vol. RAN WG1. No. Spokane, USA Nov. 12, 2018-Nov. 16, 2018 Nov. 11, 2018 (Nov. 11, 2018), XP051555545, 19 Pages, Retrieved from the Internet URL:http://www.3gpp.org/ftp/Meetings%5F3GPP%5FSYNC/RAN1/Docs/R1%2D1813489%2Ezip [retrieved on Nov. 11, 2018] Sect.s 4.1-4.3.
Panasonic: "On multi-TRP Enhancements for NK MIMO in Rel. 16", 3GPP TSG RAN WG1 Meeting #95, R1-1813135 Panasonic NR MIMO Multi TRP Enhancements, 3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018 Nov. 2, 2018 (Nov. 2, 2018),XP051479401,4 Pages, Retrieved from the Internet: URL:http://www.3gpp.org/ftp/tsg%5Fran/WG1%5FRL1/TSGR1%5F95/Docs/R1%2D1813135%2Ezip [retrieved on Nov. 2, 2018] sect.s 2.2, 2.3.
Qualcomm Incorporated: "Multi-TRP Ennancements", 3GPP Draft, 3GPP TSG-RANWG1 Meeting#95, R1-1813442 Multi-TRP Enhancements, 3rd Generation Partnership Project (3GPP), Mobile Competence Centre, 650, Route Des Lucioles, F-06921, Sophia-Antipolis Cedex, France, vol. RAN WG1, No. Spokane, WA, USA, Nov. 12, 2018-Nov. 16, 2018, Nov. 11, 2018 (Nov. 11, 2018), XP051555481, 20 pages, Retrieved from the Internet: URL:http://www.3gpp.org/ftp/Meetings%5F3GPP%5FSYNC/RAN1/Docs/R1%2D1813442%2Ezip. [retrieved on Nov. 11, 2018] Sect sect.s 3, 4, figure 1.

* cited by examiner

MULTI-TRANSMIT RECEIVE POINT MODE MIXING

CROSS-REFERENCE TO RELATED APPLICATION

This application claims priority to U.S. Provisional Patent Application No. 62/782,059, filed on Dec. 19, 2018, entitled "MULTI-TRANSMIT RECEIVE POINT MODE MIXING," which is hereby expressly incorporated by reference herein.

FIELD OF THE DISCLOSURE

Aspects of the present disclosure generally relate to wireless communication, and more particularly to techniques and apparatuses for multi-transmit receive point mode mixing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a first downlink control information (DCI) communication for scheduling a first physical downlink shared channel (PDSCH), wherein the first PDSCH is associated with at least a first transmit receive point (TRP). The method may include receiving a second DCI communication for scheduling a second PDSCH, wherein the second PDSCH is associated with a second PDSCH TRP and at least one of the first TRP or a third TRP. The method may include receiving downlink communications based at least in part on the first DCI communication and the second DCI communication.

In some aspects, a UE for wireless communication may include memory and one or more processors operatively coupled to the memory. The memory and the one or more processors may be configured to receive a first DCI communication for scheduling a first PDSCH, wherein the first PDSCH is associated with at least a first TRP. The memory and the one or more processors may be configured to receive a second DCI communication for scheduling a second PDSCH, wherein the second PDSCH is associated with a second TRP and at least one of the first TRP or a third TRP. The memory and the one or more processors may be configured to receive downlink communications based at least in part on the first DCI communication and the second DCI communication.

In some aspects, a non-transitory computer-readable medium may store one or more instructions for wireless communication. The one or more instructions, when executed by one or more processors of a UE, may cause the one or more processors to receive a first DCI communication for scheduling a first PDSCH, wherein the first PDSCH is associated with at least a first TRP. The one or more instructions, when executed by one or more processors of a UE, may cause the one or more processors to receive a second DCI communication for scheduling a second PDSCH, wherein the second PDSCH is associated with a second TRP and at least one of the first TRP or a third TRP. The one or more instructions, when executed by one or more processors of a UE, may cause the one or more processors to receive downlink communications based at least in part on the first DCI communication and the second DCI communication.

In some aspects, an apparatus for wireless communication may include means for receiving a first DCI communication for scheduling a first PDSCH, wherein the first PDSCH is associated with at least a first TRP. The apparatus may include means for receiving a second DCI communication for scheduling a second PDSCH, wherein the second PDSCH is associated with a second TRP and at least one of the first TRP or a third TRP. The apparatus may include means for receiving downlink communications based at least in part on the first DCI communication and the second DCI communication.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
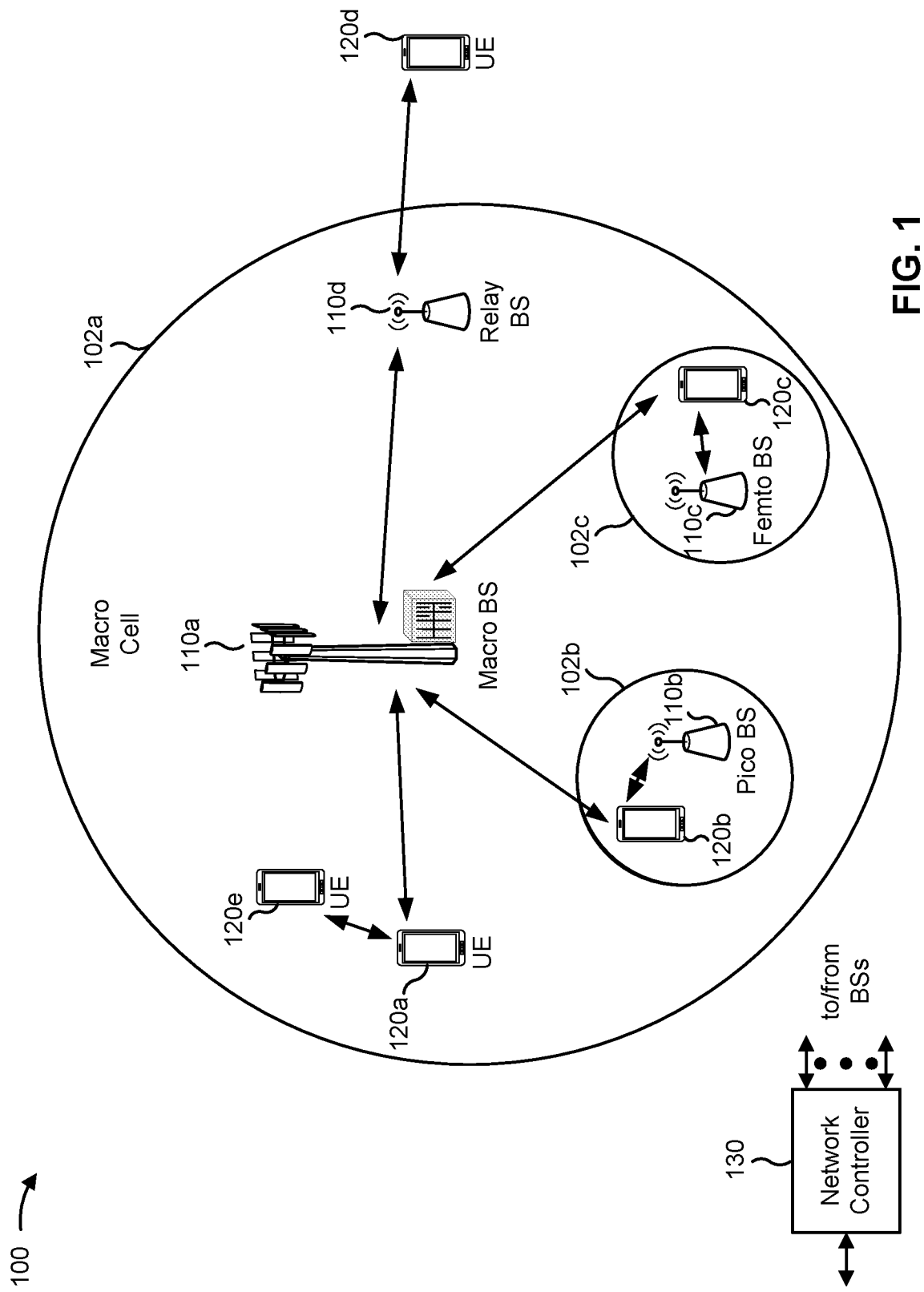
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
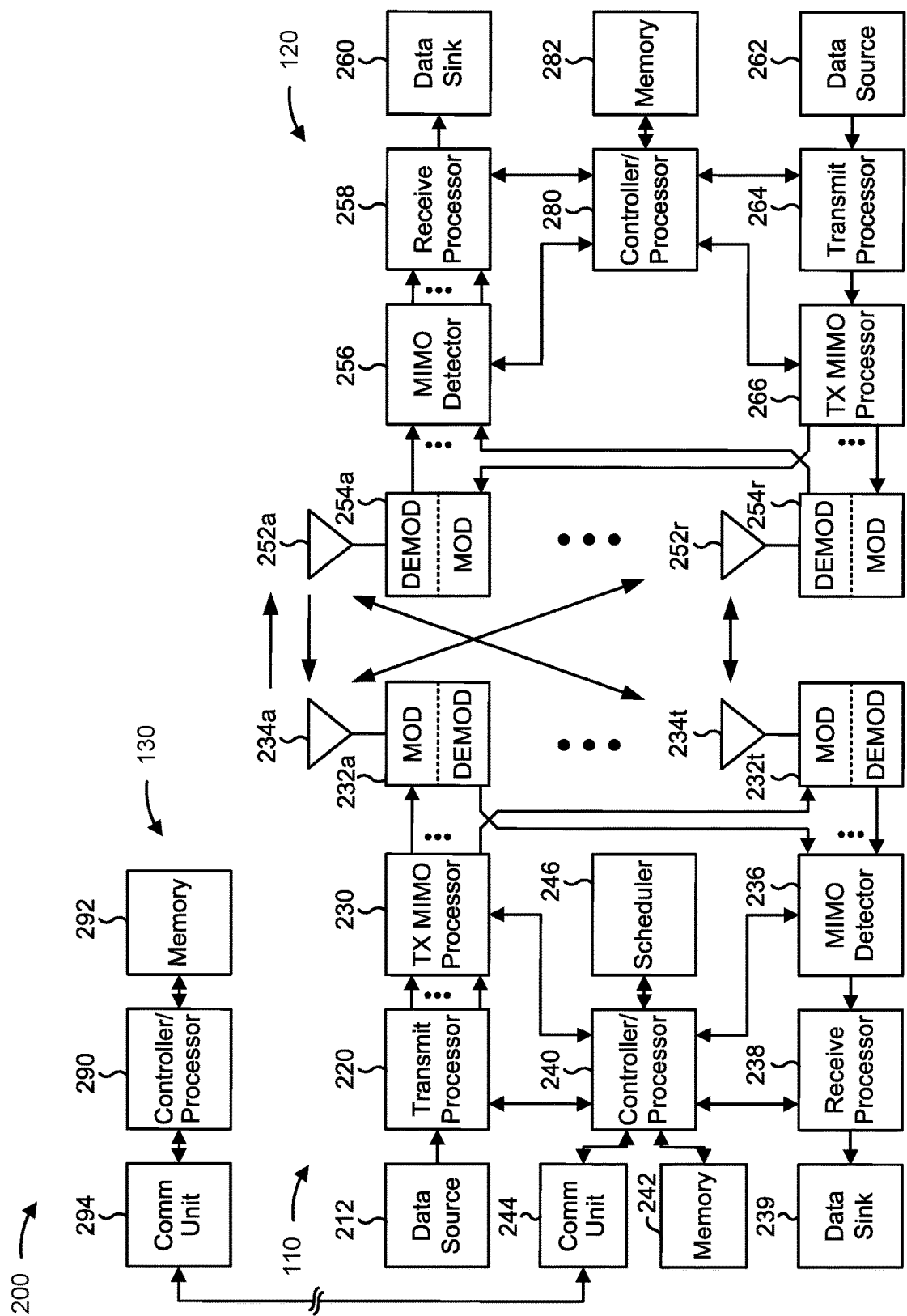
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with multi-transmit receive point mode mixing, as described in more detail elsewhere herein. For example, controller/processor 240 of base station 110, controller/processor 280 of UE 120, and/or any other component(s) of FIG. 2 may perform or direct operations of, for example, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a first downlink control information (DCI) communication for scheduling a first physical downlink shared channel (PDSCH), wherein the first PDSCH is associated with at least a first transmit receive point (TRP); means for receiving a second DCI communication for scheduling a second PDSCH, wherein the second PDSCH is associated with a second TRP and at least one of the first TRP or a third TRP; means for receiving downlink communications based at least in part on the first DCI communication and the second DCI communication; and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
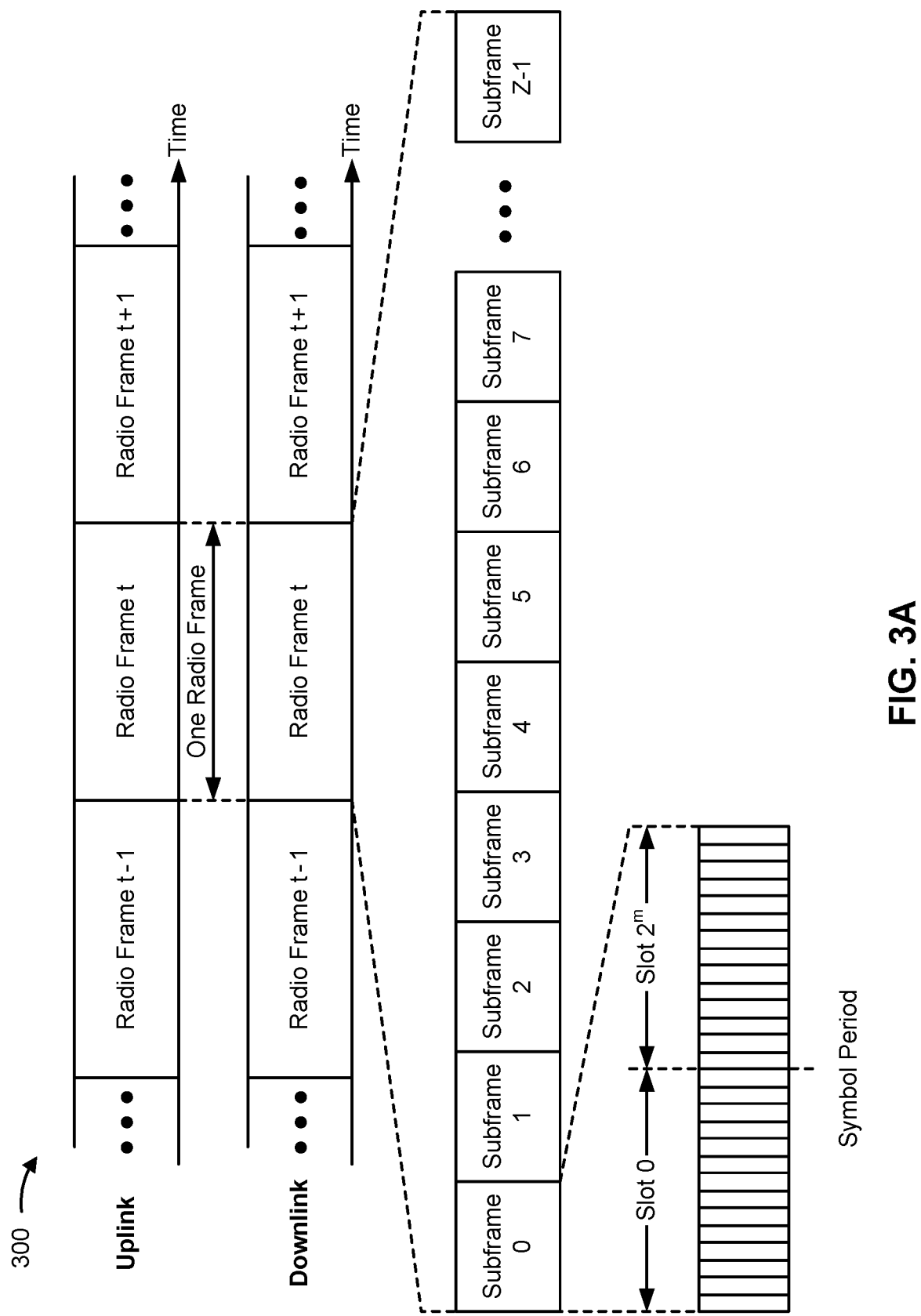
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
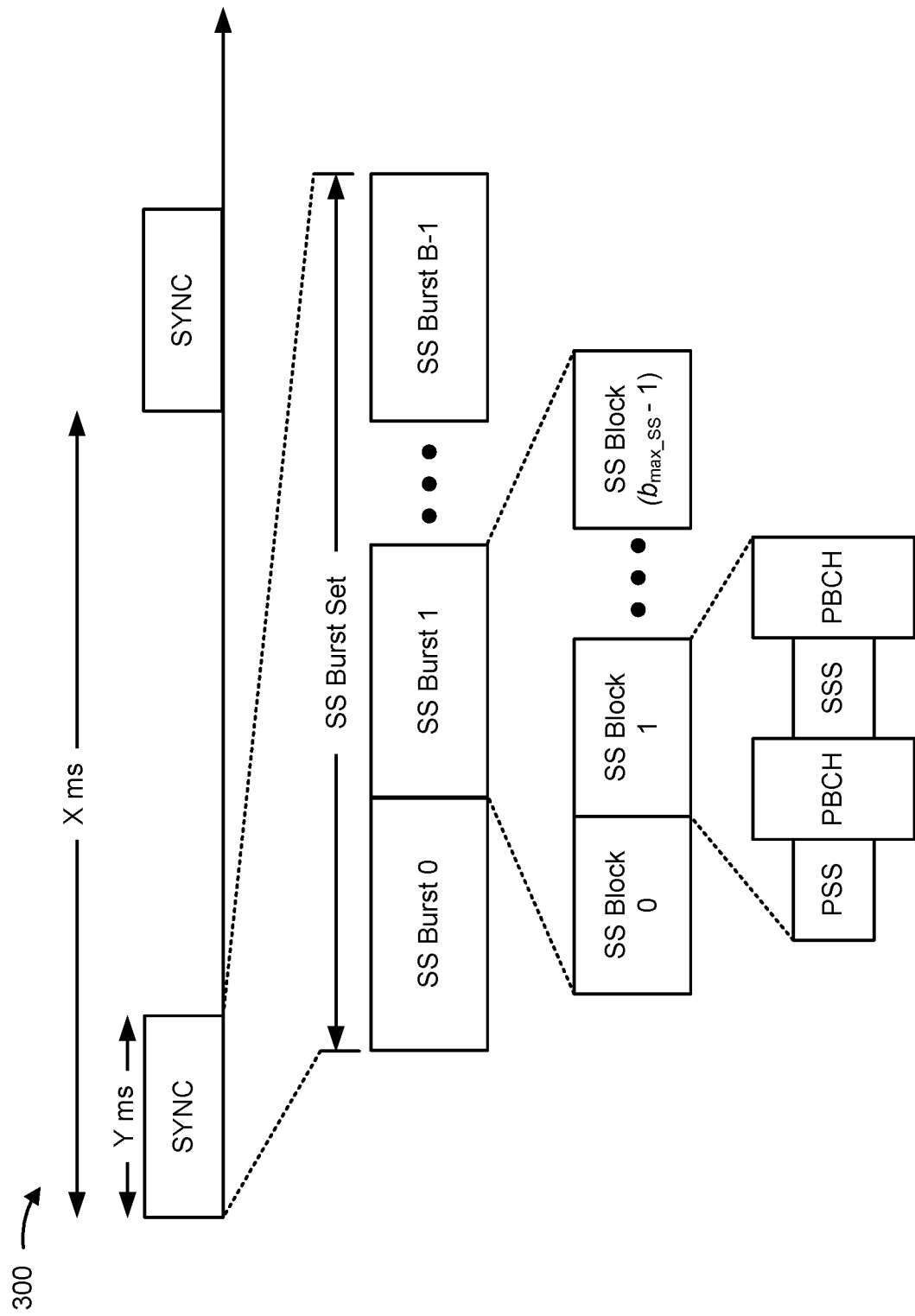
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
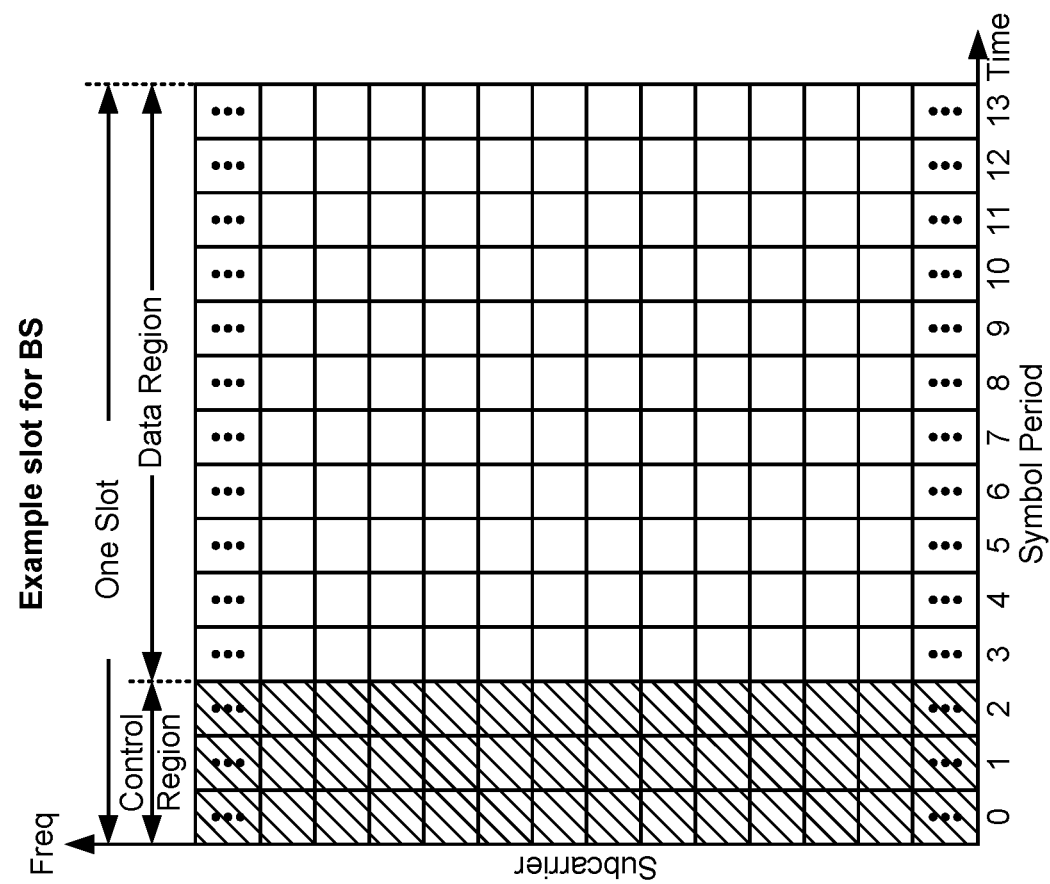
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
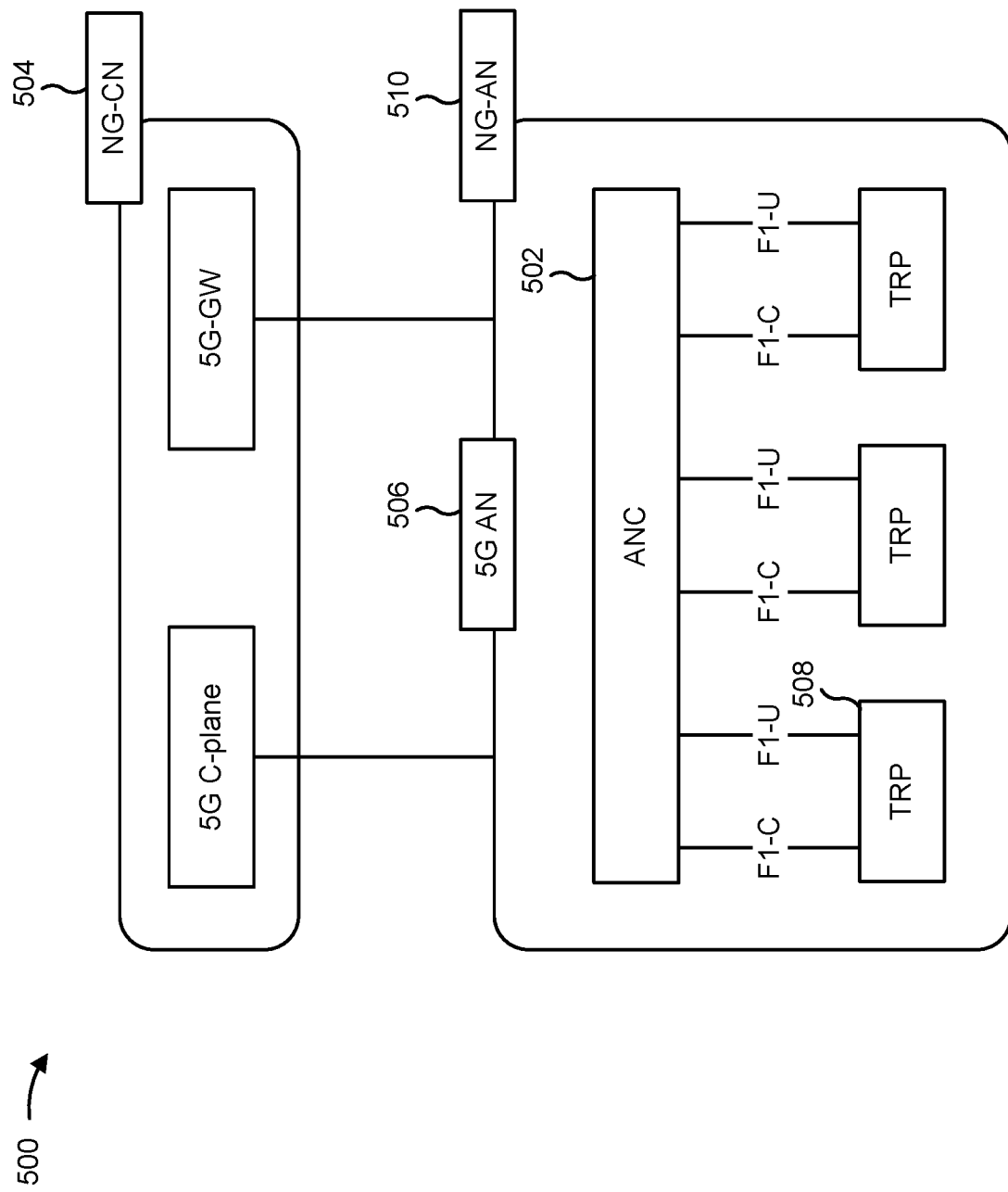
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
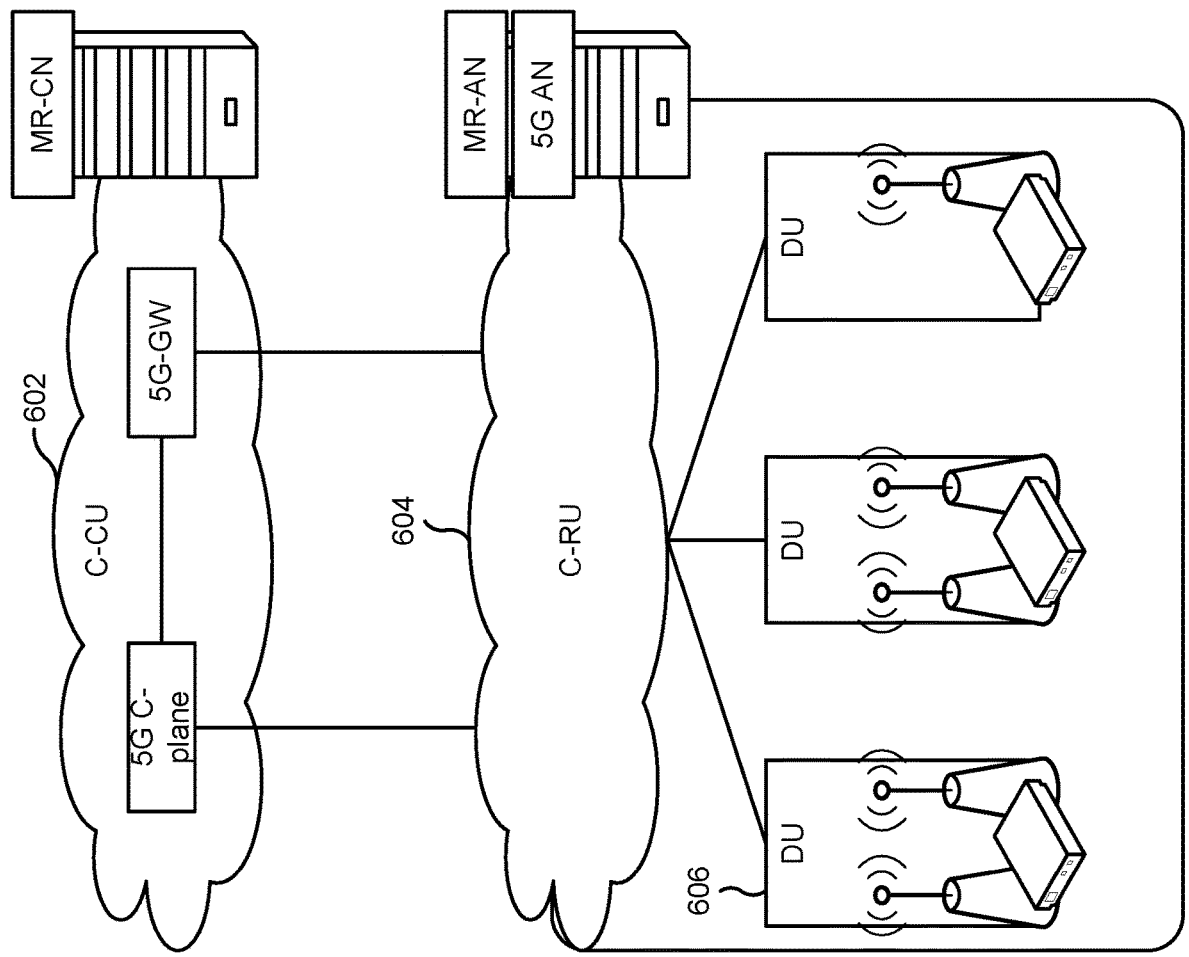
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

In a wireless network, a UE may be communicatively connected to a plurality of TRPs, referred to as multi-TRP, and may transmit communications to, and/or receive communications from, the plurality of TRPs. In some cases, a TRP, of the plurality of TRPs, may transmit a set of downlink transmission layers to the UE using a codeword (e.g., may encode the set of downlink transmission layers based at least in part on the codeword). In some cases, if the set of downlink transmission layers becomes blocked or unavailable, the UE may be unable to use the codeword for decoding downlink transmission layers, which decreases the availability of the codeword, decreases the reliability of the wireless network, and/or the like. Moreover, using a particular codeword, the UE may only be capable of communicating with a maximum of two TRPs (e.g., the particular codeword may be used by two TRPs if the particular codeword is the only codeword configured for the UE, or the particular codeword may be configured for the UE, along with another codeword, where the particular codeword is used by a first TRP and the other codeword is used by a second TRP).

Some aspects described herein provide techniques and apparatuses for multi-TRP mode mixing. In some aspects, a UE may receive a first DCI communication and a second DCI communication. The first DCI communication may schedule a first codeword associated with at least a first PDSCH of a first TRP, and the second DCI communication may schedule a second codeword associated with a second PDSCH of a second TRP and at least one of the first PDSCH of the first TRP or a third PDSCH of a third TRP. The UE may receive downlink communications based at least in part on the first DCI communication and the second DCI communication.

In this way, the first DCI communication and the second DCI communication may permit a mixing of multi-TRP scheduling modes in that the UE receives a plurality of DCI communications for scheduling a plurality of codewords (e.g., which may correspond to multi-TRP Mode 2), where one or more of the plurality of DCI communications may schedule a codeword, of the plurality of codewords, for a plurality of TRPs (e.g., which may correspond to multi-TRP Mode 1). This enables codeword diversity in that a particular codeword may be configured for two sets of downlink transmission layers. This increases the reliability and availability of the codeword in that, if one of the sets of downlink transmission layers becomes unavailable, the UE may still use the other set of downlink transmission layers of the codeword. Moreover, this permits the UE to communicate with more than two TRPs in a multi-TRP configuration in that two codewords can be scheduled for the UE, and each of the two codewords can be transmitted by two TRPs.

FIGS. 7A-7F are diagrams illustrating an example 700 of multi-transmit receive point mode mixing, in accordance with various aspects of the present disclosure. As shown in FIGS. 7A-7F, example 700 may include a plurality of transmit receive points (TRPs) (e.g., TRP1, TRP2, TRP3, TRP4, and/or the like,) and a user equipment (UE) (e.g., UE 120). In some aspects, each TRP, of the plurality of TRPs illustrated in FIGS. 7A-7F, may correspond to a respective base station (e.g., BS 110a, BS 110b, BS 110c, BS 110d, and/or the like). In some aspects, two or more TRPs, of the plurality of TRPs, may be correspond to the same base station.

In some aspects, the plurality of TRPs, and UE 120, may be included in a wireless network. In some aspects, UE 120 may be communicatively connected with the plurality of TRPs in a multi-TRP configuration (e.g., UE 120 may be communicatively connected with TRP1 and TRP2; with TRP1, TRP2, and TRP3; with TRP1, TRP2, TRP3, and TRP4; and/or the like). In some aspects, a TRP, of the plurality of TRPs, may transmit one or more downlink transmission layers (also referred to as downlink data streams) to UE 120 on a downlink of a wireless communication link between the TRP and UE 120.

Figure 7A:
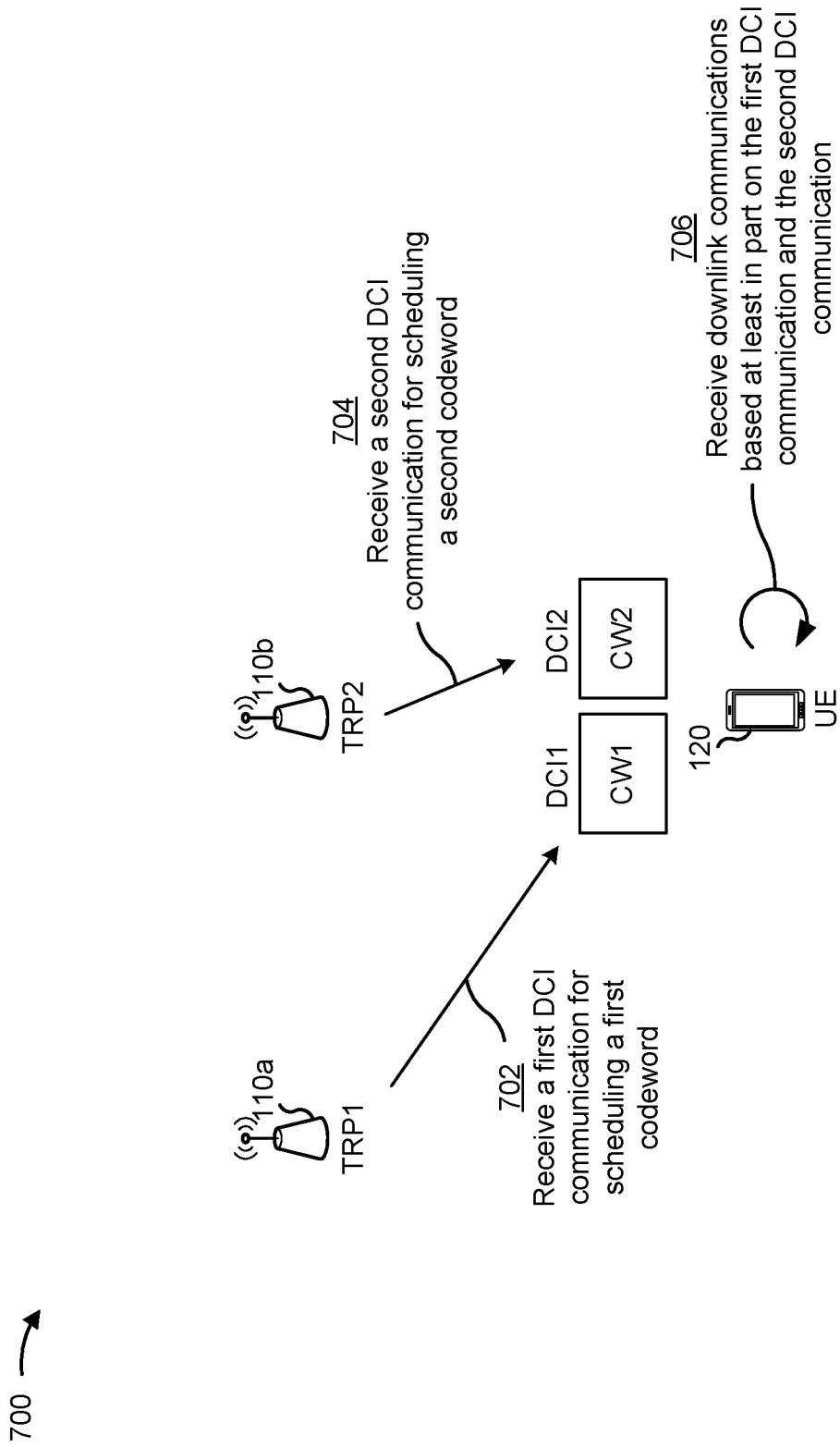
FIGS. 7A-7F are diagrams illustrating an example of multi-transmit receive point mode mixing, in accordance with various aspects of the present disclosure.

As shown in FIG. 7A, a first TRP (e.g., TRP1) and a second TRP (e.g., TRP2), of the plurality of TRPs, may each transmit a signaling communication to UE 120. The signaling communications may be used to schedule downlink communications between UE 120 and the plurality of TRPs (e.g., the transmission of downlink transmission layers to UE 120). In some aspects, the signaling communications may include a downlink control information (DCI) communication and/or another type of signaling communication. For example, and as shown by reference number 702, TRP1 may transmit a first DCI communication (e.g., DCI1) to UE 120, and as shown by reference number 704, TRP2 may transmit a second DCI communication (e.g., DCI2) to UE 120. In some aspects, the signaling communications may be transmitted, to UE 120, via a plurality of physical downlink control channels (PDCCHs). For example, TRP1 may transmit the first DCI communication via a first PDCCH, and TRP2 may transmit the second DCI communication via a second PDCCH.

In some aspects, UE 120 may simultaneously or concurrently receive the first DCI communication and the second DCI communication. In this way, the first DCI communication and the second DCI communication may permit a mixing of multi-TRP scheduling modes (e.g., concurrent Mode 1 and Mode 2 scheduling) in that UE 120 receives multiple PDCCHs carrying a plurality of DCI communications for scheduling PDSCHs (e.g., which may correspond to Mode 2), where at least one of the plurality of DCI communications (or all of the plurality of DCI communications, or a subset of the plurality of DCI communications) schedules a PDSCH that includes a codeword for a plurality of TRPs (e.g., which may correspond to Mode 1) in the same slot or subframe. The Mode 1 DCI information can include, for example, two QCL relationships and/or two DMRS port groups. In an example, similar to Mode 2 scheduling, the UE 120 may receive two PDCCHs in which the first PDCCH has Mode 1 DCI information and the second DCI is a regular DCI (e.g., a DCI that includes scheduling information for a single TRP). Additionally, the UE 120 may operate in accordance with an RRC configuration for mixed mode DCI signaling and may monitor for the different DCIs in a particular slot or subframe, in a particular control resource set (CORESET), and/or the like.

In some aspects, UE 120 may receive each of the first DCI communication and the second DCI communication in a CORESET. For example, TRP1 may transmit the first DCI communication in a first CORESET, and TRP2 may transmit the second DCI communication in a second CORESET (e.g., where the first CORESET and the second CORESET are the same CORESETs or different CORESETs). The first CORESET may be associated with the first PDCCH, and the second CORESET may be associated with the second PDCCH.

In some aspects, the first CORESET and the second CORESET may each be included in a CORESET group identified by a higher layer index. In some aspects, each CORESET group may include, for example, up to five CORESETs, and two CORESET groups may be configured. In this case, the first CORESET may be included in a first CORESET group associated with a higher layer index of 0, which may indicate that the first DCI communication is transmitted from TRP1, and the second CORESET may be included in a second CORESET group associated with a higher layer index of 1, which may indicate that the second DCI communication is transmitted from TRP2.

In some aspects, the first DCI communication and the second DCI communication may each schedule a different set of downlink transmission layers or PDSCHs that each include a codeword to UE 120. For example, the first DCI communication may schedule a first PDSCH that includes a first codeword (e.g., CW1), and the second DCI communication may schedule a second PDSCH that includes a second codeword (e.g., CW2). In some aspects, one or more TRPs, of the plurality of TRPs, may use the first codeword and/or the second codeword to encode one or more sets of downlink transmission layers or PDSCHs that are to be transmitted to UE 120.

In some aspects, at least one of the first DCI communication or the second DCI communication may schedule a PDSCH that includes a codeword to be used by a plurality of TRPs. For example, at least one of the first DCI communication or the second DCI communication may schedule a PDSCH that includes a codeword that is to be used by a first TRP to transmit a first set of downlink transmission layers on a PDSCH transmitted by the first TRP, and by a second TRP to transmit a second set of downlink transmission layers on a PDSCH transmitted by the second TRP.

In some aspects, the first DCI communication may include information identifying the first codeword, information identifying the sets of downlink transmission layers (and the beams corresponding to the TRPs that are to transmit the sets of downlink transmission layers) that are to be encoded and decoded using the first codeword, and/or the like. Similarly, the second DCI communication may include information identifying the second codeword, information identifying the sets of downlink transmission layers (and the beams corresponding to the TRPs that are to transmit the sets of downlink transmission layers) that are to be encoded and decoded using the second codeword, and/or the like.

In some aspects, the first DCI communication and the second DCI communication may each include additional information, such as transmission control indication (TCI) state information, included in a TCI field, for beam indication and performing channel estimation of the downlink transmission layers that are transmitted by the plurality of TRPs. The TCI state information, included in a DCI communication, may indicate a quantity of TCI states, which in turn may indicate a quasi-co-location (QCL) relationship between a resource signal (RS) set (which may include a synchronization signal block (SSB) reference signal, a channel state information (CSI) reference signal, and/or the like) and a demodulation reference signal (DMRS) port group. In some aspects, a TCI state may indicate a plurality of QCL relationships, where each QCL relationship, of the plurality of QCL relationships, is between a respective RS set and a respective DMRS port group, and/or the like. The DCI communication may also include information identifying a DMRS port group configuration that is to be used by UE 120 for channel estimation of the downlink between UE 120 and a TRP, such as a DMRS port group configuration index.

FIGS. 7B-7F illustrate various example configurations for multi-TRP mode mixing configurations. Configurations for multi-TRP mode mixing other than the example configurations illustrated in FIGS. 7B-7F are also contemplated.

Figure 7B:
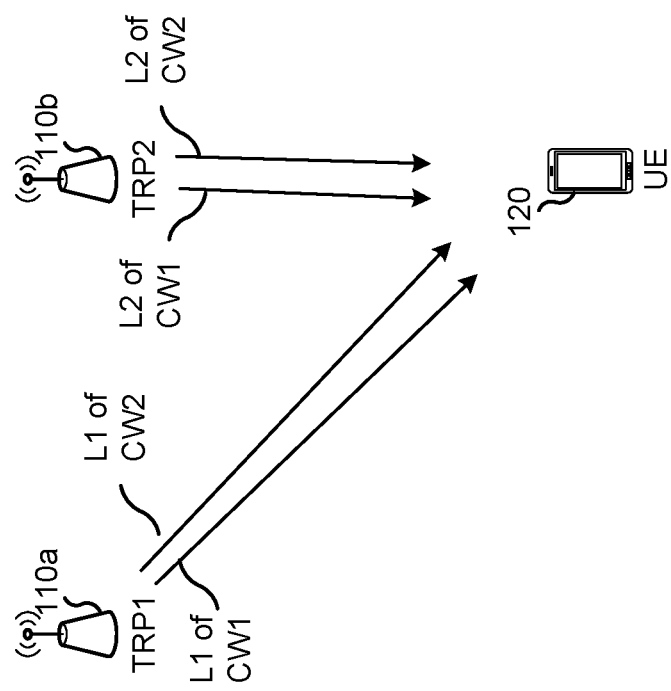

In the example configuration illustrated in FIG. 7B, the first DCI communication may schedule the first codeword to be transmitted by TRP1 through a first set of downlink transmission layers (e.g., L1 of CW1) on a a first PDSCH associated with TRP1, and by TRP2 through a second set of downlink transmission layers (e.g., L2 of CW1) on the first PDSCH associated. The second DCI communication may schedule the second codeword to be transmitted by TRP1 through the first set of downlink transmission layers (e.g., L1 of CW2) on a second PDSCH, and by TRP2 through the second set of downlink transmission layers (e.g., L2 of CW2) on the second PDSCH. The first PDSCH and the second PDSCH may be non-overlapping PDSCHs, may be partially overlapping PDSCHs, or may be fully overlapping PDSCHs.

In addition, the first DCI communication and the second DCI communication may each include a TCI field that indicates a quantity of TCI states that points to a plurality of QCL relationships (e.g., a first QCL relationship associated with TRP1 and a second QCL relationship associated with TRP2) and a plurality of DMRS port groups corresponding to the plurality of QCL relationships (e.g., a first DMRS port group, associated with the first set of downlink transmission layers transmitted by TRP1, that corresponds to the first QCL relationship, and a second DMRS port group, associated with the second set of downlink transmission layers transmitted by TRP2, that corresponds to the second QCL relationship).

Figure 7C:
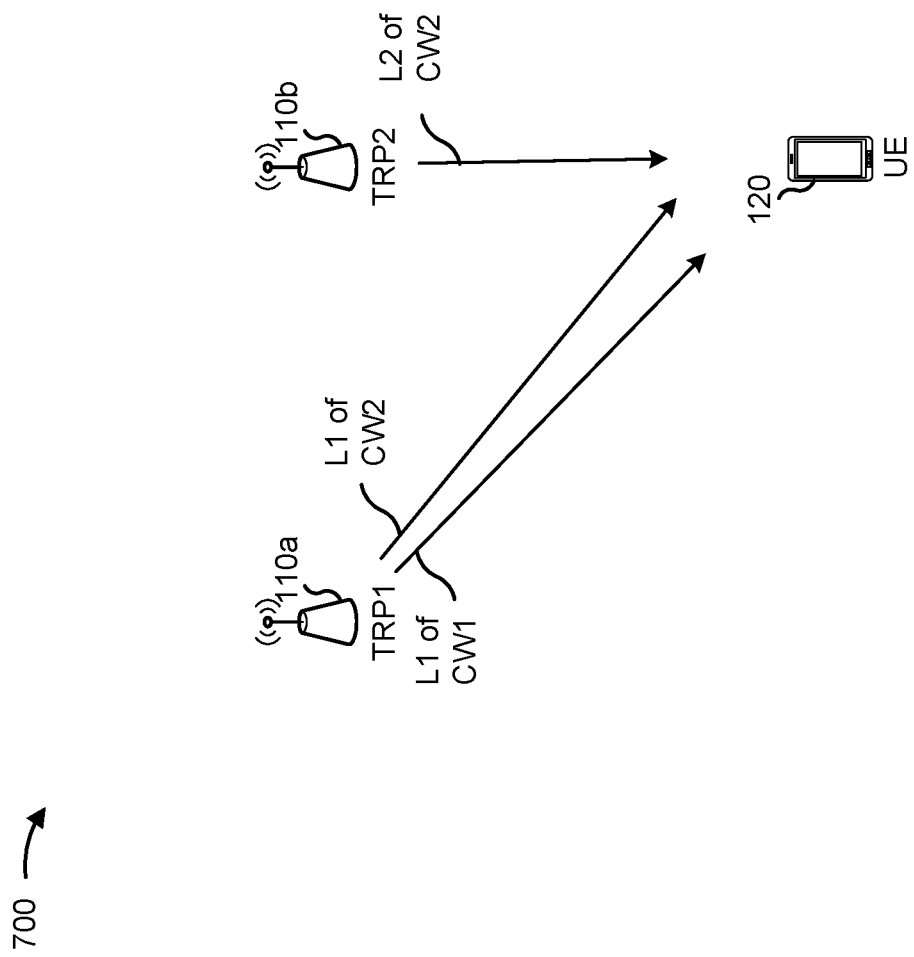

In the example configuration illustrated in FIG. 7C, the first DCI communication may schedule the first codeword to be transmitted by TRP1 through a first set of downlink transmission layers (e.g., L1 of CW1) on a PDSCH of TRP1. The second DCI communication may schedule the second codeword to be transmitted by TRP1 through the first set of downlink transmission layers (e.g., L1 of CW2) on a PDSCH, and by TRP2 through a second set of downlink transmission layers (e.g., L2 of CW2) on a PDSCH of TRP2. The PDSCHs may be non-overlapping PDSCHs, may be partially overlapping PDSCHs, or may be fully overlapping PDSCHs.

In addition, the first DCI communication may include a TCI field that indicates a quantity of TCI states pointing to a single QCL relationship associated with TRP1 and a corresponding DMRS port group associated with the first set of downlink transmission layers transmitted by TRP1. The second DCI communication may include a TCI field indicating a plurality of TCI states, which point to a plurality of QCL relationships. The plurality of QCL relationships may include a first QCL relationship associated with TRP1 and a second QCL relationship associated with TRP2. Moreover, the TCI field may indicate a plurality of DMRS port groups corresponding to the plurality of QCL relationships (e.g., a first DMRS port group, associated with the first set of downlink transmission layers transmitted by TRP1, that corresponds to the first QCL relationship, and a second DMRS port group, associated with the second set of downlink transmission layers transmitted by TRP2, that corresponds to the second QCL relationship).

Figure 7D:
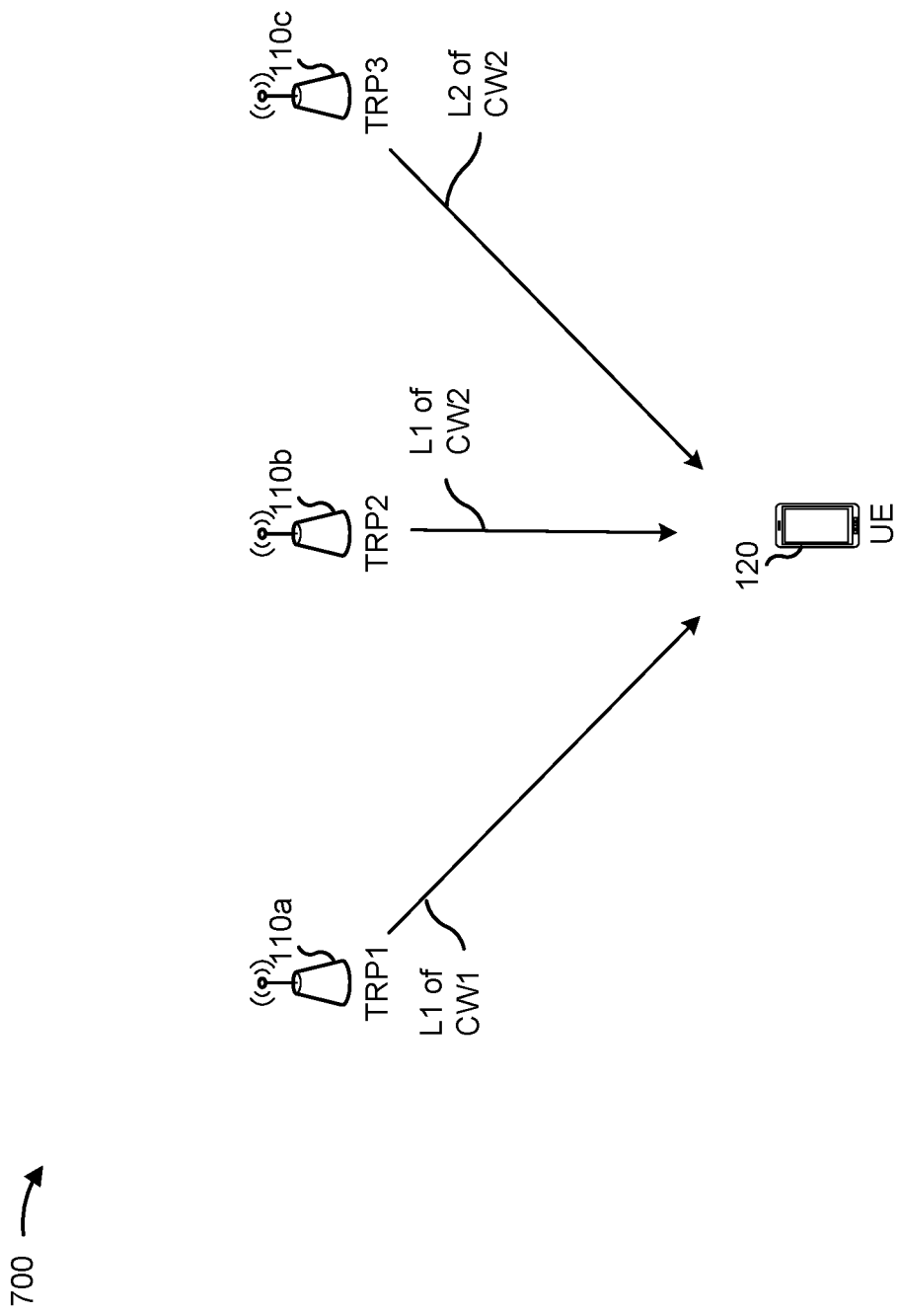

In the example configuration illustrated in FIG. 7D, the first DCI communication may schedule the first codeword to be transmitted by TRP1 through a first set of downlink transmission layers (e.g., L1 of CW1) on a PDSCH of TRP1. The second DCI communication may schedule the second codeword to be transmitted by TRP2 through a second set of downlink transmission layers (e.g., L1 of CW2) on a PDSCH of TRP2, and to be transmitted by TRP3 through a third set of downlink transmission layers (e.g., L2 of CW2) on a PDSCH of TRP3. In some aspects, two or more of the PDSCHs may be non-overlapping PDSCHs. In some aspects, two or more of the PDSCHs may be partially overlapping PDSCHs. In some aspects, two or more of the PDSCHs may be fully overlapping PDSCHs.

In addition, the first DCI communication may include a TCI field that indicates a quantity of TCI states pointing to single QCL relationship associated with TRP1 and a corresponding DMRS port group associated with the first set of downlink transmission layers transmitted by TRP1. The second DCI communication may include a TCI field indicating a plurality of TCI states pointing to a plurality of QCL relationships (e.g., a first QCL relationship associated with TRP2 and a second QCL relationship associated with TRP3) and a plurality of DMRS port groups corresponding to the plurality of QCL relationships (e.g., a first DMRS port group, associated with the second set of downlink transmission layers transmitted by TRP2, that corresponds to the first QCL relationship, and a second DMRS port group, associated with the third set of downlink transmission layers transmitted by TRP3, that corresponds to the second QCL relationship).

Figure 7E:
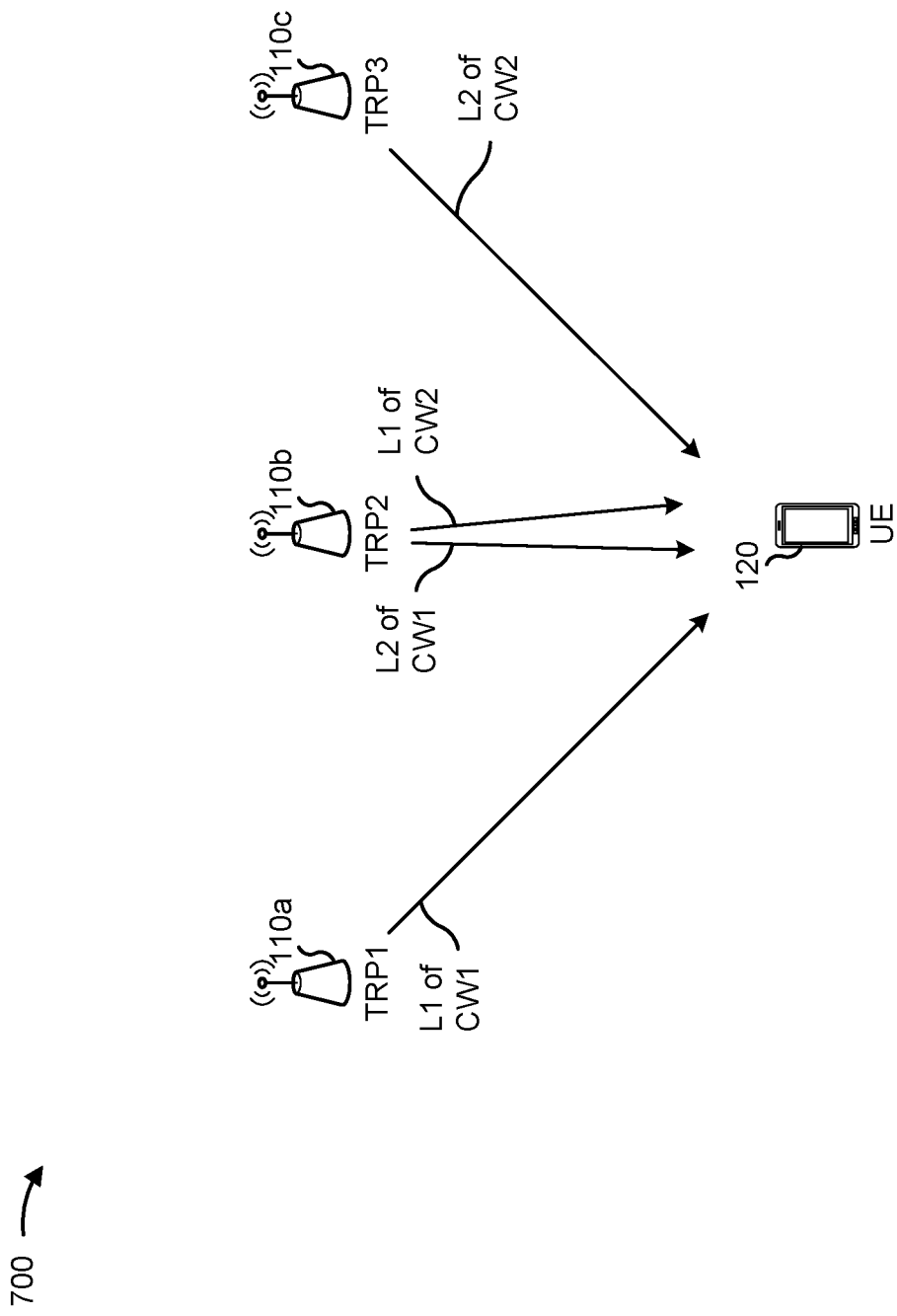

In the example configuration illustrated in FIG. 7E, the first DCI communication may schedule the first codeword to be transmitted by TRP1 through a first set of downlink transmission layers (e.g., L1 of CW1) on a PDSCH of TRP1, and to be transmitted by TRP2 through a second set of downlink transmission layers (e.g., L2 of CW1) on a PDSCH of TRP2. The second DCI communication may schedule the second codeword to be transmitted by TRP2 through the second set of downlink transmission layers (e.g., L1 of CW2) on the PDSCH, and to be transmitted by TRP3 through a third set of downlink transmission layers (e.g., L2 of CW2) on a PDSCH of TRP3. In some aspects, two or more of the PDSCHs may be non-overlapping PDSCHs. In some aspects, two or more of the PDSCHs may be partially overlapping PDSCHs. In some aspects, two or more of the PDSCHs may be fully overlapping PDSCHs.

In addition, the first DCI communication may include a TCI field identifying a plurality of TCI states pointing to a plurality of QCL relationships (e.g., a first QCL relationship associated with TRP1 and a second QCL relationship associated with TRP2) and a plurality of DMRS port groups corresponding to the plurality of QCL relationships (e.g., a first DMRS port group, associated with the first set of downlink transmission layers transmitted by TRP1, that corresponds to the first QCL relationship, and a second DMRS port group, associated with the second set of downlink transmission layers transmitted by TRP2, that corresponds to the second QCL relationship). The second DCI communication may include a TCI field that identifies a plurality of TCI states pointing to a plurality of QCL relationships (e.g., a first QCL relationship associated with TRP2 and a second QCL relationship associated with TRP3) and a plurality of DMRS port groups corresponding to the plurality of QCL relationships (e.g., a first DMRS port group, associated with the second set of downlink transmission layers transmitted by TRP2, that corresponds to the first QCL relationship, and a second DMRS port group, associated with the third set of downlink transmission layers transmitted by TRP3, that corresponds to the second QCL relationship).

Figure 7F:
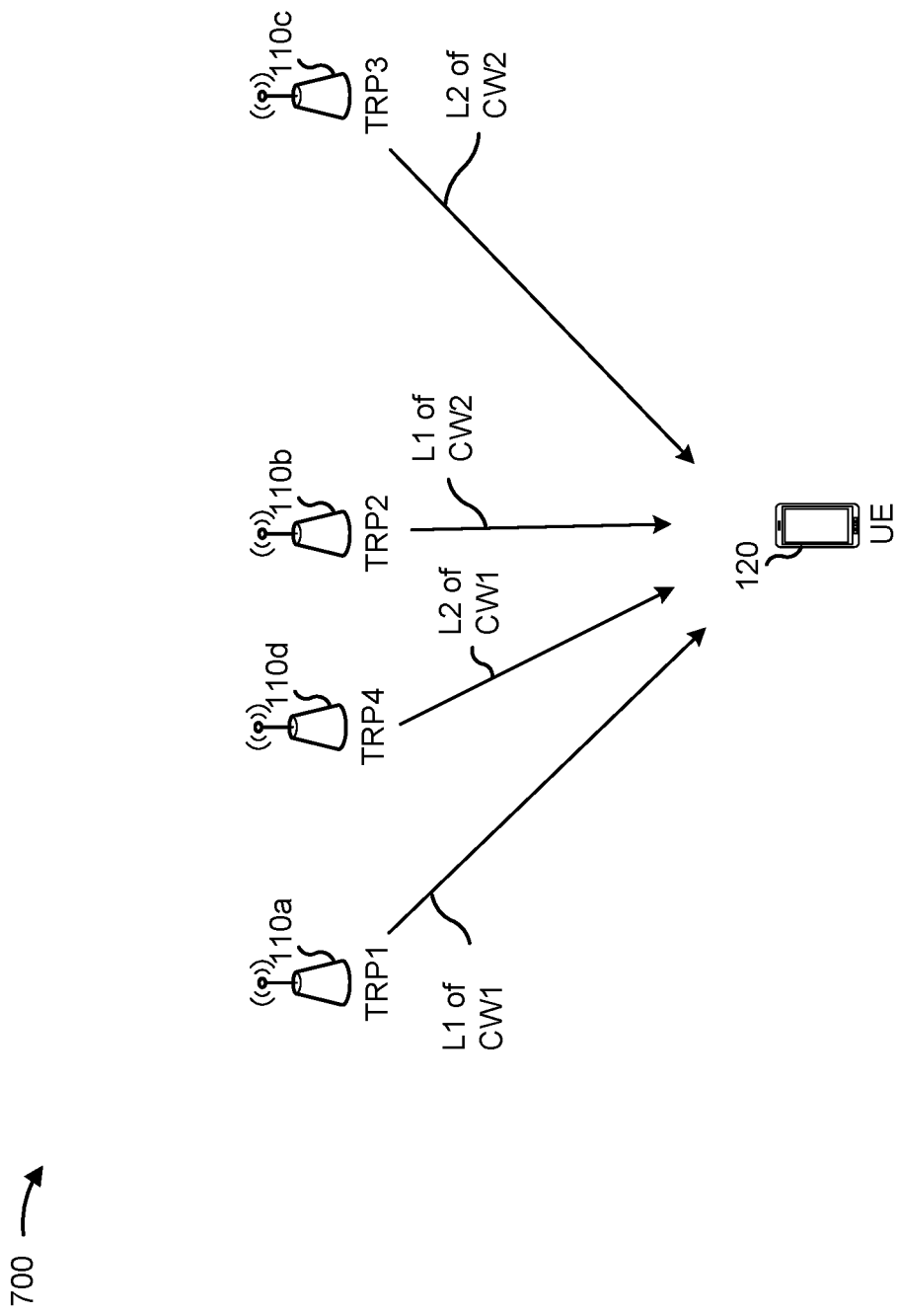

In the example configuration illustrated in FIG. 7F, the first DCI communication may schedule the first codeword to be transmitted by TRP1 through a first set of downlink transmission layers (e.g., L1 of CW1) on a PDSCH of TRP1, and to be transmitted by TRP4 through a second set of downlink transmission layers (e.g., L2 of CW1) on a PDSCH of TRP4. The second DCI communication may schedule the second codeword to be transmitted by TRP2 through a third set of downlink transmission layers (e.g., L1 of CW2) on a PDSCH of TRP2, and to be transmitted by TRP3 through a fourth set of downlink transmission layers (e.g., L2 of CW2) on a PDSCH of TRP3. In some aspects, two or more of the PDSCHs may be non-overlapping PDSCHs. In some aspects, two or more of the PDSCHs may be partially overlapping PDSCHs. In some aspects, two or more of the PDSCHs may be fully overlapping PDSCHs.

In addition, the first DCI communication may include a TCI field that indicates a plurality of TCI states pointing to a plurality of QCL relationships (e.g., a first QCL relationship associated with TRP1 and a second QCL relationship associated with TRP4) and a plurality of DMRS port groups corresponding to the plurality of QCL relationships (e.g., a first DMRS port group, associated with the first set of downlink transmission layers transmitted by TRP1, that corresponds to the first QCL relationship, and a second DMRS port group, associated with the second set of downlink transmission layers transmitted by TRP4, that corresponds to the second QCL relationship). The second DCI communication may include a TCI state field that indicates a plurality of TCI states pointing to a plurality of QCL relationships (e.g., a first QCL relationship associated with TRP2 and a second QCL relationship associated with TRP3) and a plurality of DMRS port groups corresponding to the plurality of QCL relationships (e.g., a first DMRS port group, associated with the third set of downlink transmission layers transmitted by TRP2, that corresponds to the first QCL relationship, and a second DMRS port group, associated with the fourth set of downlink transmission layers transmitted by TRP3, that corresponds to the second QCL relationship).

Returning to FIG. 7A, and as shown by reference number 706, UE 120 may receive the first DCI communication and the second DCI communication, and may receive downlink communications, from one or more TRPs of the plurality of TRPs, based at least in part on the first DCI communication and the second DCI communication. For example, UE 120 may use the first codeword, specified in the first DCI communication, to decode a set of downlink transmission layers that is encoded using the first codeword; may use the second codeword, specified in the second DCI communication, to decode a set of downlink transmission layers that is encoded using the second codeword; and/or the like. Moreover, UE 120 may use the QCL relationships and/or DMRS port groups, indicated in the first DCI communication and/or the second DCI communication, to perform channel estimations of the sets of downlink transmission layers that are transmitted by the plurality of TRPs.

In this way, the first DCI communication and the second DCI communication may permit a mixing of multi-TRP scheduling modes in that UE120 receives a plurality of DCI communications for scheduling a plurality of codewords (e.g., which may correspond to multi-TRP Mode 2), where one or more of the plurality of DCI communications may schedule a codeword, of the plurality of codewords, for a plurality of TRPs (e.g., which may correspond to multi-TRP Mode 1). This enables codeword diversity in that a particular codeword may be configured for two sets of downlink transmission layers. This increases the reliability and availability of the codeword in that, if one of the sets of downlink transmission layers becomes unavailable, UE 120 may still use the codeword for the other set of downlink transmission layers. Moreover, this permits UE 120 to communicate with more than two TRPs in a multi-TRP configuration, in that two codewords can be scheduled for UE 120, and each of the two codewords can be used by two TRPs.

As indicated above, FIGS. 7A-7F are provided as an example. Other examples may differ from what is described with respect to FIGS. 7A-7F.

Figure 8:
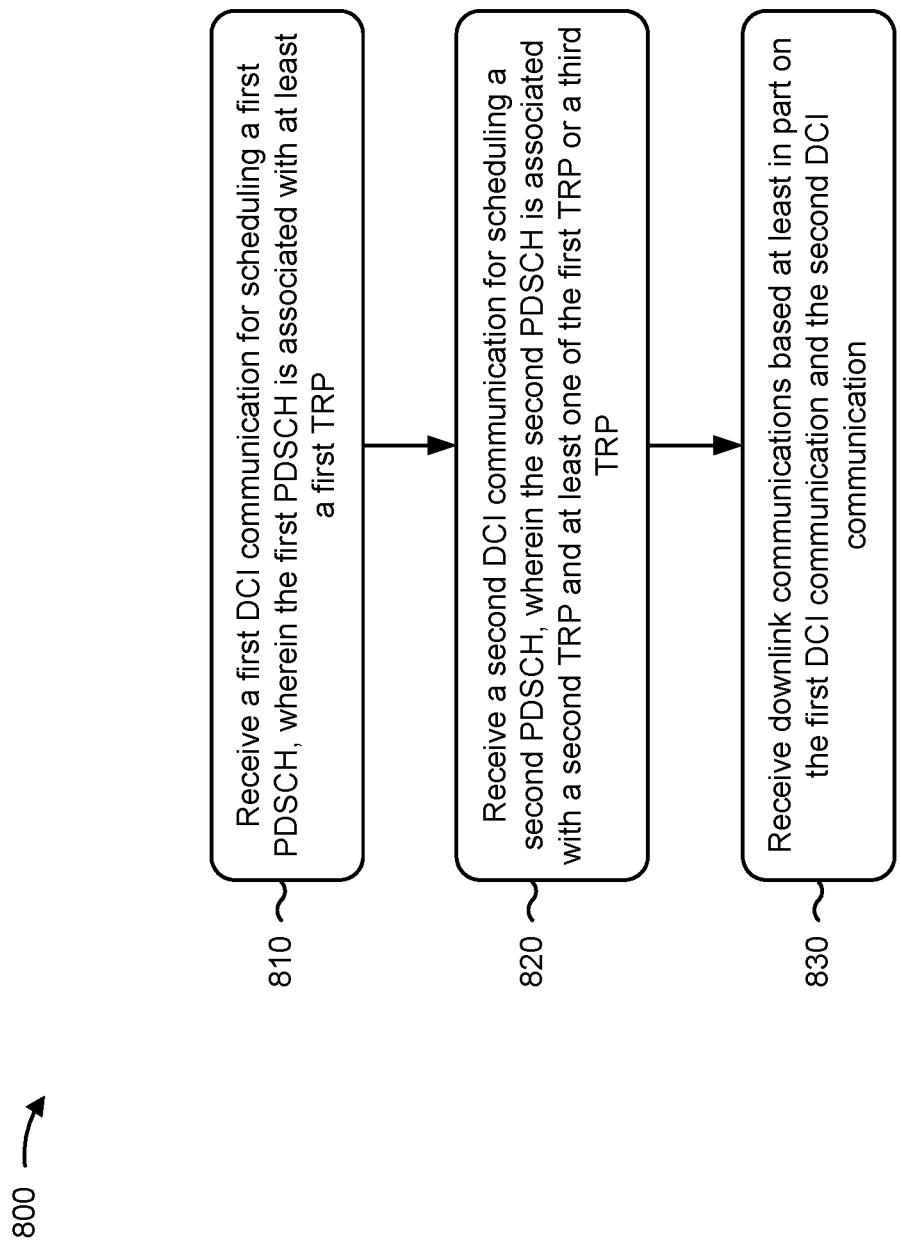
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs multi-transmit receive point mode mixing.

As shown in FIG. 8, in some aspects, process 800 may include receiving a first DCI communication for scheduling a first PDSCH, wherein the first PDSCH is associated with at least a first TRP (block 810). For example, the UE (e.g., using receive processor 258, controller/processor 280, memory 282, and/or the like) may receive a first DCI communication for scheduling a first PDSCH, as described above. In some aspects, the first PDSCH is associated with at least a first TRP.

As shown in FIG. 8, in some aspects, process 800 may include receiving a second DCI communication for scheduling a second PDSCH, wherein the second PDSCH is associated with a second TRP and at least one of the first TRP or a third TRP (block 820). For example, the UE (e.g., using receive processor 258, controller/processor 280, memory 282, and/or the like) may receive a second DCI communication for scheduling a second PDSCH, as described above. In some aspects, the second PDSCH is associated with a second TRP and at least one of the first TRP or a third TRP.

As shown in FIG. 8, in some aspects, process 800 may include receiving downlink communications based at least in part on the first DCI communication and the second DCI communication (block 830). For example, the UE (e.g., using receive processor 258, controller/processor 280, memory 282, and/or the like) may receive downlink communications based at least in part on the first DCI communication and the second DCI communication, as described above.

Process 800 may include additional aspects, such as any single aspect and/or any combination of aspects described below and/or in connection with one or more other processes described elsewhere herein.

In a first aspect, the first DCI communication and the second DCI communication each indicate, in a TCI field, a quantity of TCI states. In a second aspect, alone or in combination with the first aspect, the first DCI communication indicates, in a TCI state field included in the first DCI communication, a single TCI state associated with a QCL relationship associated with the first TRP; the second DCI communication schedules downlink transmission of the second codeword to the UE by the second TRP and the first TRP; and the second DCI communication indicates, in a TCI field included in the second DCI communication, a plurality of TCI states associated with the QCL relationship associated with the first TRP and a QCL relationship associated with the second TRP.

In a third aspect, alone or in combination with one or more of the first and second aspects, at least one of the first DCI communication and the second DCI communication indicates one of a plurality of DMRS port groups corresponding to a plurality of TCI states. In some aspects, a first DMRS port group, of the plurality of DMRS port groups, corresponds to a first TCI state of the plurality of TCI states; a second DMRS port group, of the plurality of DMRS port groups, corresponds to a second TCI state of the plurality of TCI states; and the first TCI state and the second TCI state are different TCI states.

In a fourth aspect, alone or in combination with one or more of the first through third aspects, the first DCI communication and the second DCI communication each indicate a first DMRS port group associated with a first set of downlink transmission layers that is transmitted by the first TRP and a second DMRS port group associated with second set of downlink transmission layers that is transmitted by the second TRP. In a fifth aspect, alone or in combination with one or more of the first through fourth aspects, the first DCI communication indicates a first DMRS port group associated with a first set of downlink transmission layers that are transmitted by the first TRP, and the second DCI communication indicates a second DMRS port group associated with a second set of downlink transmission layers that is transmitted by the second TRP and a third set of downlink transmission layers that is transmitted by the third TRP.

In a sixth aspect, alone or in combination with one or more of the first through fifth aspects, the first DCI communication indicates a first DMRS port group associated with a first set of downlink transmission layers that is transmitted by the first TRP and a second DMRS port group associated with a second set of downlink transmission layers that is transmitted by a fourth TRP, and the second DCI communication indicates a third DMRS port group associated with a third set of downlink transmission layers that is transmitted by the second TRP and a fourth DMRS port group associated with a fourth set of downlink transmission layers that is transmitted by the third TRP. In a seventh aspect, alone or in combination with one or more of the first through sixth aspects, the first DCI communication indicates a first DMRS port group associated with a first set of downlink transmission layers that is transmitted by the first TRP and a second DMRS port group associated with a second set of downlink transmission layers that is transmitted by the second TRP, and the second DCI communication specifies the second DMRS port group associated with the second set of downlink transmission layers that is transmitted by the second TRP and a third DMRS port group associated with a third set of downlink transmission layers that is transmitted by the third TRP.

In an eighth aspect, alone or in combination with one or more of the first through seventh aspects, the first DCI communication indicates a first DMRS port group associated with a first set of downlink transmission layers that is transmitted by the first TRP, and the second DCI communication indicates the first DMRS port group associated with the first set of downlink transmission layers that is transmitted by the first TRP and a second DMRS port group associated with a second set of downlink transmission layers that is transmitted by the second TRP.

In a ninth aspect, alone or in combination with one or more of the first through eighth aspects, the first PDSCH, the second PDSCH, and the third PDSCH are non-overlapping PDSCHs. In a tenth aspect, alone or in combination with one or more of the first through ninth aspects, two or more of the first PDSCH, the second PDSCH, and the third PDSCH at least partially overlap. In an eleventh aspect, alone or in combination with one or more of the first through twelfth aspects, the quantity of TCI states is two for one or both of the TCI fields in the first DCI and the second DCI, and the TCI states indicated by the TCI fields of the first DCI and the second DCI are a same TCI state or different TCI states.

In a twelfth aspect, alone or in combination with one or more of the first through eleventh aspects, receiving the first DCI communication comprises receiving the first DCI communication in a CORESET that is included in a first CORESET group, wherein the first DCI communication being received in the CORESET that is included in the first CORESET group indicates that the first DCI communication is associated with the first TRP, and receiving the second DCI communication comprises receiving the second DCI communication in a CORESET that is included in a second CORESET group, wherein the second DCI communication being received in the CORESET that is included in the second CORESET group indicates that the first DCI communication is associated with the second TRP. In a thirteenth aspects, alone or in combination with one or more of the first through twelfth aspects, receiving the second DCI communication comprises simultaneously receiving, in a same slot, the second DCI communication with the first DCI communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
  receiving, via a first physical downlink control channel (PDCCH), a first downlink control information (DCI) communication for scheduling a first physical downlink shared channel (PDSCH) associated with a first transmit receive point (TRP);
  receiving, via a second PDCCH, a second DCI communication for scheduling a second PDSCH associated with a second TRP,
    wherein the first PDCCH and the second PDCCH are configured for multi-TRP scheduling, and
    wherein the first DCI communication and the second DCI communication each indicate, in a transmission configuration indication (TCI) field, TCI states,
    wherein the TCI states indicate, for at least one of the first DCI communication or the second DCI communication, at least one of:
      a first quasi co-located (QCL) relationship associated with the first TRP, and a second QCL relationship associated with the second TRP, or
      a first demodulation reference signal (DMRS) port group associated with a first set of downlink transmission layers that is transmitted by the first TRP, and a second DMRS port group associated with a second set of downlink transmission layers that is transmitted by the second TRP; and
  receiving downlink communications based at least in part on the first DCI communication and the second DCI communication.

2. The method of claim 1, wherein the TCI states include two TCI states for one or both of the TCI fields in the first DCI and the second DCI; and
  wherein the TCI states indicated by the TCI fields of the first DCI and the second DCI are a same TCI state or different TCI states.

3. The method of claim 2, wherein the first PDSCH and the second PDSCH are non-overlapping, completely overlapping, or partially overlapping PDSCHs.

4. The method of claim 1, wherein the first DCI communication indicates, in a first TCI field included in the first DCI communication, a single TCI state associated with the first QCL relationship associated with the first TRP;
  wherein the second DCI communication schedules downlink transmission of the second PDSCH to the UE by the second TRP and the first TRP; and
  wherein the TCI states indicated in the second DCI communication indicate
    the first QCL relationship and the second QCL relationship.

5. The method of claim 1, wherein the TCI states indicate the first DMRS port group from a plurality of DMRS port groups.

6. The method of claim 5, wherein the first DMRS port group corresponds to a first TCI state of the TCI states;
  wherein a second DMRS port group, of the plurality of DMRS port groups, corresponds to a second TCI state of the TCI states; and
  wherein the first TCI state and the second TCI state are different TCI states.

7. The method of claim 1, wherein the first DCI communication and the second DCI communication each indicate:
  the first DMRS port group, and
  the second DMRS port group.

8. The method of claim 1, wherein the first DCI communication indicates:
  the first DMRS port group, and
  wherein the second DCI communication indicates:
  the second DMRS port group, and
  a third DMRS port group associated with a third set of downlink transmission layers that is transmitted by a third TRP.

9. The method of claim 1, wherein the first DCI communication indicates:
  the first DMRS port group, and
  the second DMRS port group; and
  wherein the second DCI communication indicates:
    a third DMRS port group associated with a third set of downlink transmission layers that is transmitted by the second TRP, and
    a fourth DMRS port group associated with a fourth set of downlink transmission layers that is transmitted by a fourth TRP.

10. The method of claim 1, wherein the first DCI communication indicates:
  the first DMRS port group, and
  the second DMRS port group; and
  wherein the second DCI communication indicates:
    the second DMRS port group, and
    a third DMRS port group associated with a third set of downlink transmission layers that is transmitted by a third TRP.

11. The method of claim 1, wherein the first DCI communication indicates:
  the first DMRS port group, and
  wherein the second DCI communication indicates:
    the first DMRS port group, and
    the second DMRS port group.

12. The method of claim 1, wherein receiving the second DCI communication comprises:
  simultaneously receiving, in a same slot, the second DCI communication with the first DCI communication.

13. The method of claim 1, wherein the multi-TRP scheduling is configured for mixing multiple multi-TRP scheduling modes.

14. A user equipment (UE) for wireless communication, comprising:
  a memory; and
  one or more processors coupled to the memory, the one or more processors configured to:
    receive, via a first physical downlink control channel (PDCCH), a first downlink control information (DCI) communication for scheduling a first physical downlink shared channel (PDSCH) associated with a first transmit receive point (TRP);
    receive, via a second PDCCH, a second DCI communication for scheduling a second PDSCH associated with a second TRP,
      wherein the first PDCCH and the second PDCCH are configured for multi-TRP scheduling, and
      wherein the first DCI communication and the second DCI communication each indicate, in a transmission configuration indication (TCI) field, a quantity of TCI states,
      wherein the TCI states indicate, for at least one of the first DCI communication or the second DCI communication, at least one of:

a first quasi co-located (QCL) relationship associated with the first TRP, and a second QCL relationship associated with the second TRP, or a first demodulation reference signal (DMRS) port group associated with a first set of downlink transmission layers that is transmitted by the first TRP, and a second DMRS port group associated with a second set of downlink transmission layers that is transmitted by the second TRP; and receive downlink communications based at least in part on the first DCI communication and the second DCI communication.

15. The UE of claim 14, wherein the first DCI communication indicates, in a first TCI field included in the first DCI communication, a single TCI state associated with a QCL relationship associated with the first TRP;

wherein the second DCI communication schedules downlink transmission of the second PDSCH to the UE by the second TRP and the first TRP; and wherein the TCI states indicated in second DCI communication indicates:
the first QCL relationship, and
the second QCL relationship.

16. The UE of claim 14, wherein of the TCI states indicate the first DMRS port group from a plurality of DMRS port groups.

17. The UE of claim 14, wherein the first DCI communication and the second DCI communication each indicate:
the first DMRS port group, and
the second DMRS port group.

18. The UE of claim 14, wherein the first DCI communication indicates:
the first DMRS port group, and
the second DMRS port group; and
wherein the second DCI communication indicates:
the second DMRS port group, and
a third DMRS port group.

19. The UE of claim 14, wherein the one or more processors, when receiving the second DCI communication, are to:
simultaneously receive, in a same slot, the second DCI communication with the first DCI communication.

20. The UE of claim 14, wherein the multi-TRP scheduling is configured for mixing multiple multi-TRP scheduling modes.

21. A non-transitory computer-readable medium storing one or more instructions for wireless communication, the one or more instructions comprising:
one or more instructions that, when executed by one or more processors of a user equipment (UE), cause the one or more processors to:
receive, via a first physical downlink control channel (PDCCH), a first downlink control information (DCI) communication for scheduling a first physical downlink shared channel (PDSCH) associated with a first transmit receive point (TRP);
receive, via a second PDCCH, a second DCI communication for scheduling a second PDSCH associated with a second TRP,
wherein the first PDCCH and the second PDCCH are configured for multi-TRP scheduling, and
wherein the first DCI communication and the second DCI communication each indicate, in a transmission configuration indication (TCI) field, TCI states,
wherein the TCI states indicate, for at least one of the first DCI communication or the second DCI communication, at least one of:
a first quasi co-located (QCL) relationship associated with the first TRP, and a second QCL relationship associated with the second TRP, or
a first demodulation reference signal (DMRS) port group associated with a first set of downlink transmission layers that is transmitted by the first TRP, and a second DMRS port group associated with a second set of downlink transmission layers that is transmitted by the second TRP; and
receive downlink communications based at least in part on the first DCI communication and the second DCI communication.

22. The non-transitory computer-readable medium of claim 21, wherein the first DCI communication indicates, in a first TCI field included in the first DCI communication, a single TCI state associated with the first QCL relationship associated with the first TRP;

wherein the second DCI communication schedules downlink transmission of the second PDSCH to the UE by the second TRP and the first TRP; and wherein the TCI states indicated in the second DCI communication indicate
the first QCL relationship and the second QCL relationship.

23. The non-transitory computer-readable medium of claim 21, wherein the TCI states indicate the first DMRS port group from a plurality of DMRS port groups.

24. The non-transitory computer-readable medium of claim 21, wherein the one or more instructions, that cause the one or more processors to receive the second DCI communication, cause the one or more processors to:
simultaneously receive, in a same slot, the second DCI communication with the first DCI communication.

25. The non-transitory computer-readable medium of claim 21, wherein the multi-TRP scheduling is configured for mixing multiple multi-TRP scheduling modes.

26. An apparatus for wireless communication, comprising:
means for receiving, via a first physical downlink control channel (PDCCH), a first downlink control information (DCI) communication for scheduling a first physical downlink shared channel (PDSCH) associated with a first transmit receive point (TRP);
means for receiving, via a second PDCCH, a second DCI communication for scheduling a second PDSCH associated with a second TRP,
wherein the first PDCCH and the second PDCCH are configured for multi-TRP scheduling, and
wherein the first DCI communication and the second DCI communication each indicate, in a transmission configuration indication (TCI) field, TCI states,
wherein the TCI states indicate, for at least one of the first DCI communication or the second DCI communication, at least one of:
a first quasi co-located (QCL) relationship associated with the first TRP, and a second QCL relationship associated with the second TRP, or
a first demodulation reference signal (DMRS) port group associated with a first set of downlink transmission layers that is transmitted by the first TRP, and a second DMRS port group associated with a second set of downlink transmission layers that is transmitted by the second TRP; and means for receiving downlink communications based at least in part on the first DCI communication and the second DCI communication.

27. The apparatus of claim 26, wherein the first DCI communication indicates, in a first TCI field included in the first DCI communication, a single TCI state associated with the first QCL relationship associated with the first TRP;
wherein the second DCI communication schedules downlink transmission of the second PDSCH to the apparatus by the second TRP and the first TRP; and
wherein the TCI states indicated in second DCI communication indicate:
the first QCL relationship, and
the second QCL relationship.

28. The apparatus of claim 26, wherein the TCI states indicate the first DMRS port group from a plurality of DMRS port groups.

29. The apparatus of claim 26, wherein the first DCI communication indicates:
the first DMRS port group, and
the second DMRS port group; and
wherein the second DCI communication indicates:
the second DMRS port group, and
a third DMRS port group.

30. The apparatus of claim 26, wherein the means for receiving the second DCI communication comprises:
means for simultaneously receiving, in a same slot, the second DCI communication with the first DCI communication.

* * * * *